US008230396B2

(12) United States Patent
Reed et al.

(10) Patent No.: US 8,230,396 B2
(45) Date of Patent: Jul. 24, 2012

(54) APPARATUS AND METHOD TO DEBUG A SOFTWARE PROGRAM

(75) Inventors: David Charles Reed, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1690 days.

(21) Appl. No.: 11/326,651

(22) Filed: Jan. 6, 2006

(65) Prior Publication Data

US 2007/0168980 A1 Jul. 19, 2007

(51) Int. Cl.
*G06F 9/44* (2006.01)
*G06F 11/00* (2006.01)
*G11C 29/00* (2006.01)

(52) U.S. Cl. ............ 717/124; 714/25; 714/33; 714/37; 714/38.11; 714/47.1; 714/723; 714/799

(58) Field of Classification Search ........................ None
See application file for complete search history.

(56) References Cited

U.S. PATENT DOCUMENTS

| | | | | |
|---|---|---|---|---|
| 5,119,377 A | * | 6/1992 | Cobb et al. | 714/38 |
| 5,153,881 A | * | 10/1992 | Bruckert et al. | 714/10 |
| 5,619,644 A | * | 4/1997 | Crockett et al. | 714/45 |
| 6,182,243 B1 | * | 1/2001 | Berthe et al. | 714/38 |
| 6,275,956 B1 | * | 8/2001 | On et al. | 717/125 |
| 6,418,543 B1 | | 7/2002 | Goli et al. | |
| 6,633,876 B1 | | 10/2003 | Heatlie | |
| 6,694,427 B1 | | 2/2004 | Mericas et al. | |
| 2002/0124209 A1 | | 9/2002 | Faust et al. | |
| 2003/0159088 A1 | | 8/2003 | Phillips et al. | |
| 2004/0205399 A1 | | 10/2004 | Wang et al. | |
| 2004/0215999 A1 | | 10/2004 | Ott et al. | |
| 2005/0108689 A1 | * | 5/2005 | Hooper et al. | 717/135 |
| 2005/0177821 A1 | | 8/2005 | Ogata et al. | |

OTHER PUBLICATIONS

China Patent & Trademark Office communication dated Nov. 20, 2009.
European Patent Office communication dated Oct. 13, 2009.

* cited by examiner

*Primary Examiner* — Emerson Puente
*Assistant Examiner* — Jonathan R Labud
(74) *Attorney, Agent, or Firm* — Dale F. Regelman; Quarles & Brady LLP

(57) ABSTRACT

A method is disclosed to debug a computer program. The method provides a computer program comprising source code, and a listing of that source code. The method further provides a computing device comprising a data storage medium, and stores the computer program in that data storage medium. The method then runs the computer program, and subsequently detects an error condition. The method creates and saves to the data storage medium a dump file comprising (N) save areas. Using information abstracted from the dump file and the source code listing, the method reproduces the source code execution at the time the error condition was detected.

18 Claims, 4 Drawing Sheets

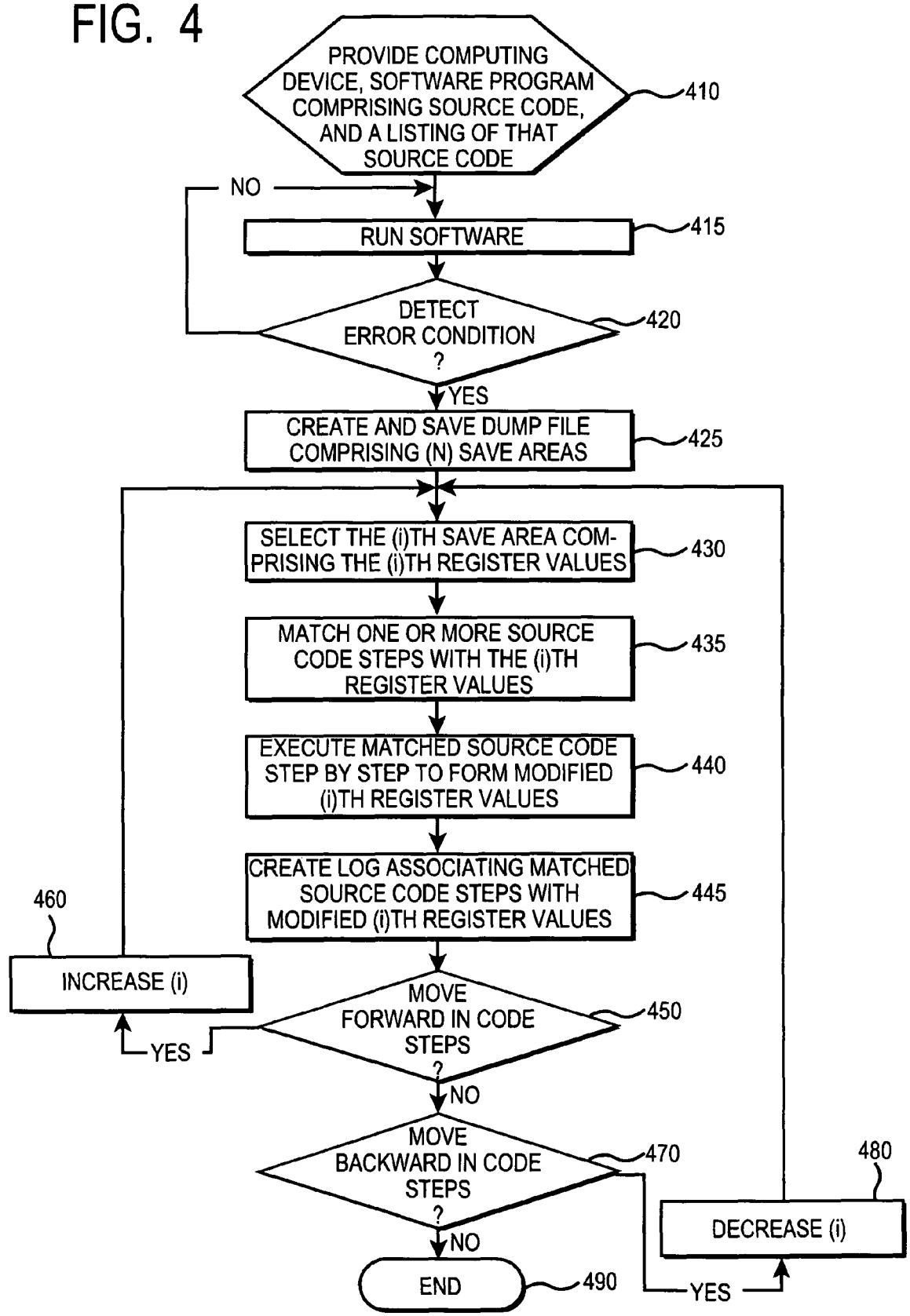

APPARATUS AND METHOD TO DEBUG A SOFTWARE PROGRAM

FIELD OF THE INVENTION

The invention relates to an apparatus and method to debug a software program.

BACKGROUND OF THE INVENTION

Although the complexity and scope of software has increased tremendously over the past decades, advances in software engineering techniques for producing the software have been only moderate, at best. Software development has remained primarily a labor-intensive effort and thus subject to human limitations.

In commercial software development, increased complexity of products, shortened development cycles, and higher customer expectations of quality have placed a major responsibility on the areas of software debugging, testing, and verification. A key ingredient that contributes to a reliable programming systems product is the assurance that the program will perform satisfactorily in terms of its functional and non-functional specifications within the expected deployment environments. In a typical commercial development organization, the cost of providing this assurance via appropriate debugging, testing, and verification activities can easily range from 50 to 75 percent of the total development cost.

What is needed is a method to automate the debugging of software programs.

SUMMARY OF THE INVENTION

Applicants' invention comprises a method to debug a computer program. Applicants' method provides a computer program comprising source code, and a listing of that source code. The method further provides a computing device comprising a data storage medium, and stores the computer program on that data storage medium.

The method then runs the computer program, and if the method detects an error condition then the method creates and saves to the data storage medium a dump file comprising (N) save areas. Using information abstracted from the dump file and the source code listing, the method reproduces the source code execution at the time the error condition was detected.

BRIEF DESCRIPTION OF THE DRAWINGS

The invention will be better understood from a reading of the following detailed description taken in conjunction with the drawings in which like reference designators are used to designate like elements, and in which:

FIG. 4 is a flow chart summarizing the steps of Applicants' method.

DETAILED DESCRIPTION OF THE PREFERRED EMBODIMENTS

Figure 1:
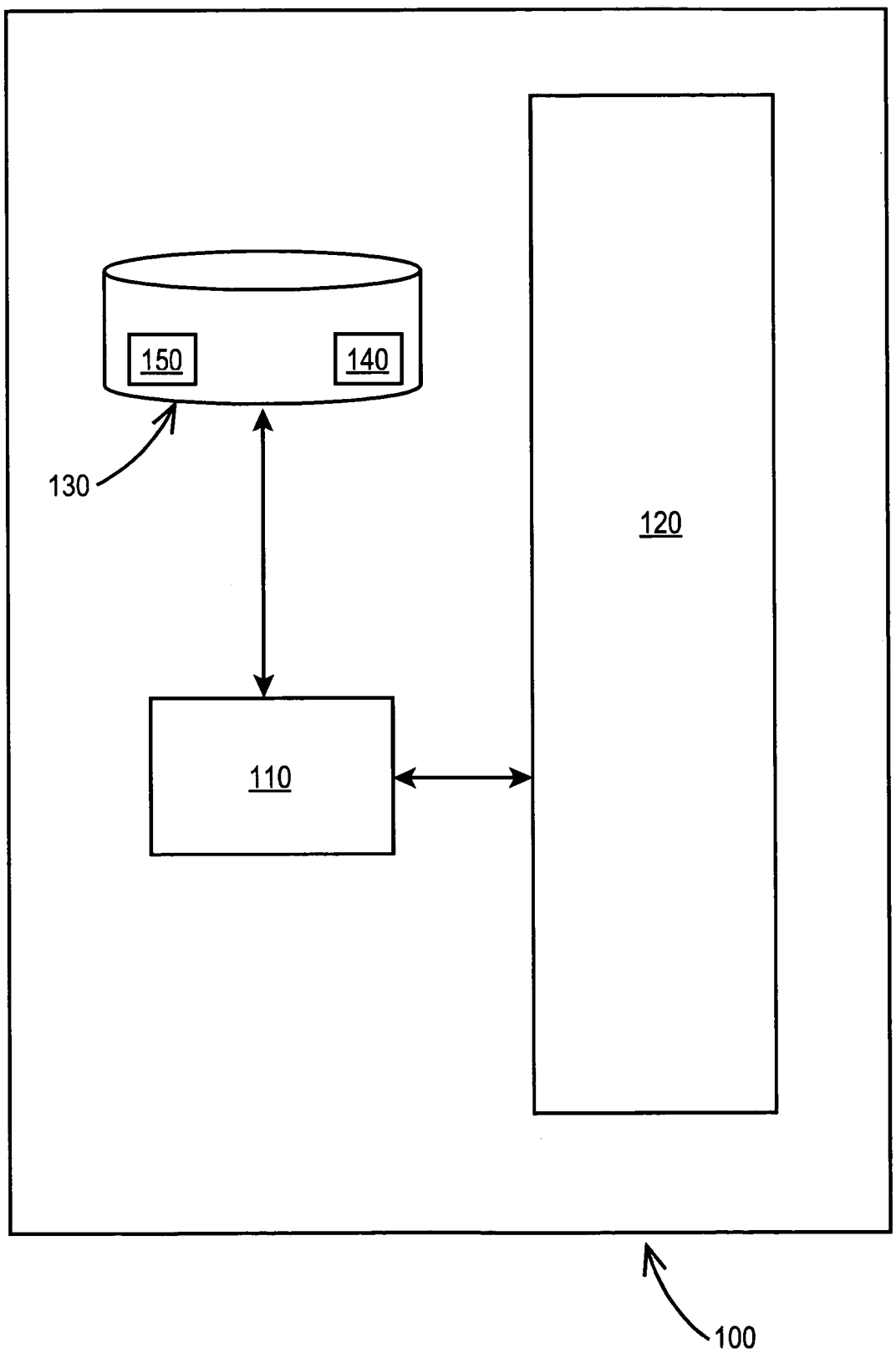
FIG. 1 is a block diagram showing the components of Applicants' computing device.

This invention is described in preferred embodiments in the following description with reference to the Figures, in which like numbers represent the same or similar elements. FIG. 4 summarizes the steps of Applicants' method. Referring now to FIG. 4, in step 410 Applicants' method provides a software program, such as software program 140, wherein that software program comprises source code. Step 410 further comprises providing a listing of that source code and a computing device, such as computing device 100 (FIG. 1). In the illustrated embodiment of FIG. 1, computing device 100 further comprises processor 110, RAM memory 120, and data storage medium 130. In certain embodiments step 410 further comprises storing the software program, such as software program 140, on the data storage medium, such as data storage medium 130.

In certain embodiments, data storage medium 130 comprises non-volatile memory, such as for example one or more EEPROMs (Electrically Erasable Programmable Read Only Memory), one or more flash PROMs (Programmable Read Only Memory), battery backup RAM, hard disk drive, one or more optical storage media (CD, DVD, and the like), combinations thereof, and the like.

As a general matter, computing device 100 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald).

In step 415, Applicants' method runs that software program. In certain embodiments and referring now to FIG. 2, step 415 further comprises loading software program 140 into RAM memory 120. As processor 110 runs software program 140, processor 110 generates and saves to RAM 120 a plurality of register values. In the illustrated embodiment of FIG. 2, RAM save area 210 comprises a plurality of register values 220, RAM save area 230 comprises a plurality of register values 240, and RAM save area 250 comprises a plurality of register values 260. RAM 120 further comprises blocks of machine language 270, 280, and 290.

In step 420, Applicants' method determines if an error condition is detected while running software program 140. In certain embodiments, Applicants' method includes causing the error condition of step 420.

Figure 2:
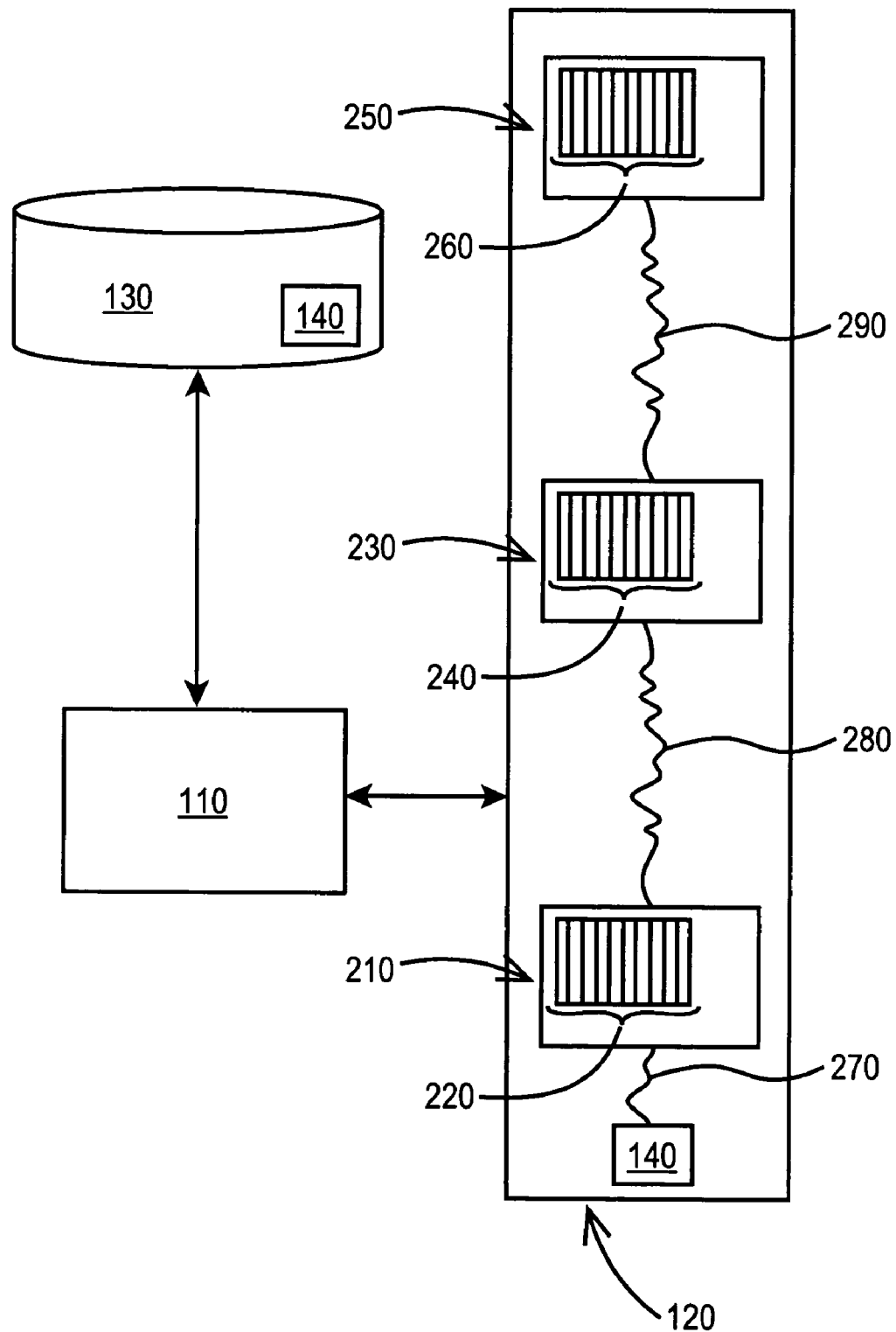
FIG. 2 is a block diagram showing three save areas each comprising a plurality of register values created as the computing device of FIG. 1 runs a software program.
Figure 3:
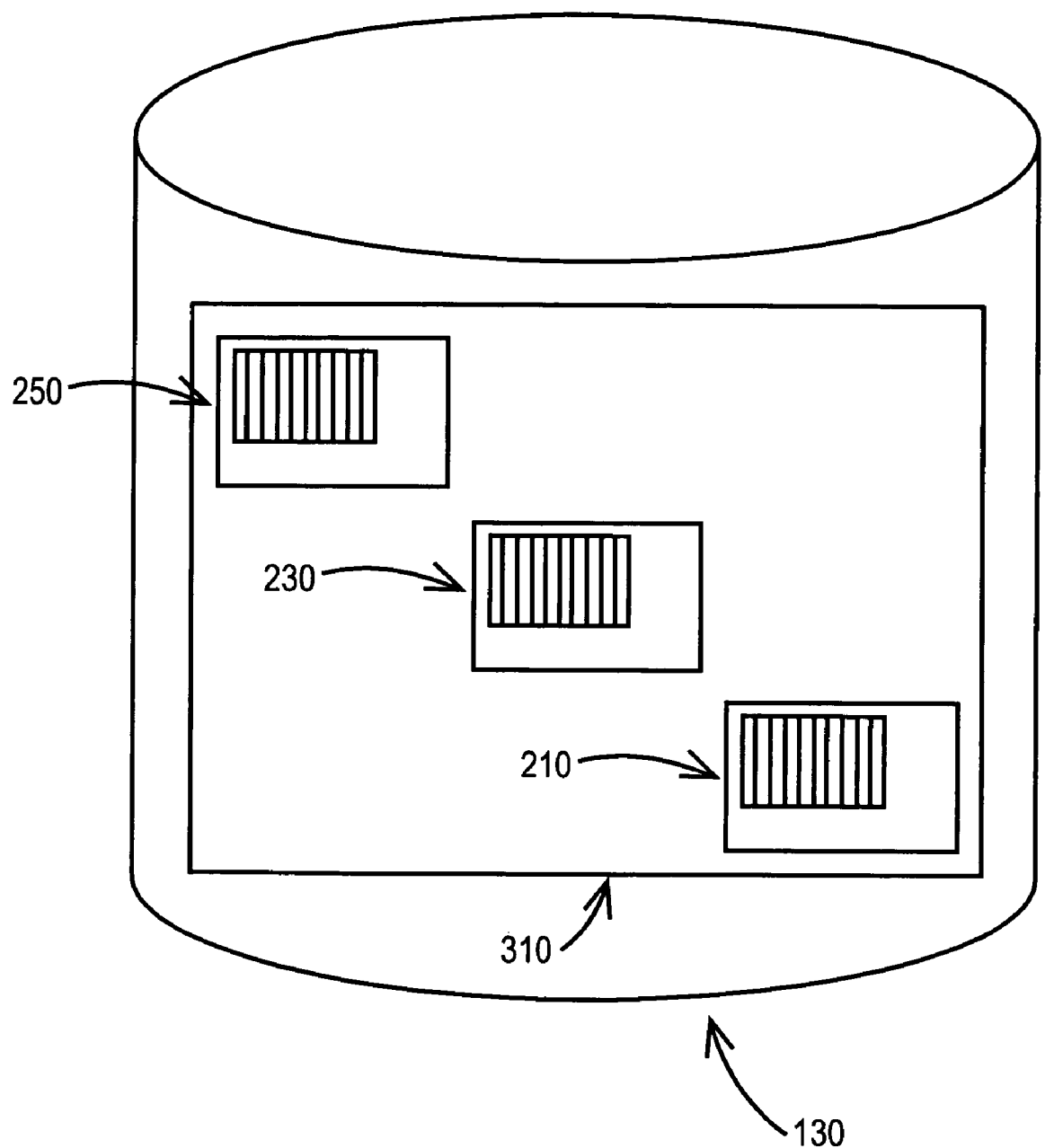
FIG. 3 is a block diagram showing a dump file comprising three save areas, where that dump file is created and saved after detecting a software error condition.

If Applicants' method does not detect an error condition while running software program, then the method transitions from step 420 to step 415 and the software execution continues. Alternatively, if Applicants' method does detect an error condition, then the method transitions from step 420 to step 425 wherein the method creates and stores a dump file comprising (N) save areas. For example and referring now to FIG. 3, in step 425 Applicants' method creates dump file 310, and saves that dump file 310 to data storage medium 130. In the illustrated embodiment of FIG. 3, dump file 310 comprises save area 210 comprising plurality of register values 220 (FIG. 2), save area 230 comprising plurality of register values 240 (FIG. 2), and save area 250 comprising plurality of register values 260 (FIG. 2). For purposes of clarity, FIGS. 2 and 3 show three save areas. As a general matter, Applicants' method creates and saves a dump file comprising (N) save areas, wherein (N) is greater than or equal to 1 and less than or equal to about 100.

Applicants' method in steps 430 through 480 utilizes the listing of executable source code of step 410 along with the dump file created and saved in step 425 to reproduce the source code execution at the time the error condition was detected. In certain embodiments, Applicants' method transitions immediately from step 425 to step 430. In other embodiments, the analysis of steps 430 through 480 is performed asynchronously, meaning that step 425 is performed at a first time and step 430 is performed at a second time, where the second time is one or more hours later than the first time.

In certain embodiments, the analysis of steps 430 through 480 is performed using a different computing device than the computing device of step 410. In these embodiments, step 425 further comprises providing a second computing device comprising a second data storage medium, wherein the dump file of step 425, such as dump file 310, is stored on the second data storage medium disposed in the second computing device wherein steps 430 through 480 are performed asynchronously with step 425.

In step 430, Applicants' method selects one of the (N) saves areas, i.e. the (i)th save area, wherein (i) is greater than or equal to 1 and less than or equal to (N). For example, in step 430 Applicants' method may select save area 230 (FIGS. 2, 3) comprising plurality of register values 240 (FIG. 2).

In step 435, Applicants' method matches the one or more source code steps with the (i)th register values. As a general matter, at least one of the (i)th register values comprises a pointer to one or more source code steps. In step 440, Applicants' method executes the matched source code step by step to form modified (i)th register values. In step 445, Applicants' method creates a log associating the each of the matched source code steps with modified (i)th register values. The log of step 445 allows testing, debugging, and/or verification of the software program step by step going either forward or backward in the source code.

In step 450, Applicants' method determines whether to examine source code steps executed subsequent to the matched source code of step 440. If Applicants' method elects to examine source code performed subsequent to the matched source code of step 440, then the method transitions from step 450 to step 460 wherein the method increases (i). In certain embodiments, step 460 comprises incrementing (i) by unity. In other embodiments, step 460 comprises increasing (i) by more than 1. Applicants' method transitions from step 460 to step 430 and continues as described herein.

If Applicants' method elects in step 450 not to examine source code steps executed subsequent to the matched source code of step 440, then the method transitions from step 450 to step 470 wherein the method determines whether to examine source code steps executed prior to the matched source code of step 440. If Applicants' method elects to examine source code performed prior to the matched source code of step 440, then the method transitions from step 470 to step 480 wherein the method decreases (i). In certain embodiments, step 480 comprises decrementing (i) by unity. In other embodiments, step 480 comprises decreasing (i) by more than 1. Applicants' method transitions from step 480 to step 430 and continues as described herein. If Applicants' method elects in step 470 not to examine source code steps executed prior to the matched source code of step 440, then the method transitions from step 470 to step 490 and ends.

In certain embodiments, Applicants' invention includes instructions, such as instructions 150 (FIG. 1), where those instructions are executed by processor 110 (FIG. 1) to perform one or more of steps 410, 415, 420, 425, 430, 435, 440, 445, 450, 460, 470, 480, and/or 490, recited in FIG. 4.

In other embodiments, Applicants' invention includes instructions residing in any other computer program product, where those instructions are executed by a computer external to, or internal to, computing device 100 (FIG. 1) to perform one or more of steps 410, 415, 420, 425, 430, 435, 440, 445, 450, 460, 470, 480, and/or 490, recited in FIG. 4. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to debug a computer program, comprising in the following order:
   providing a computer program comprising source code;
   providing a listing of said source code;
   providing a first computing device comprising RAM memory and a first data storage medium;
   storing said computer program in said first data storage medium;
   executing said computer program;
   loading said computer program into said RAM memory;
   generating in said RAM memory a plurality of RAM save areas (N), wherein each RAM save area comprises a plurality of register values, and wherein said RAM save areas are interconnected by blocks of machine language;
   determining if an error condition is detected;
   operative if an error condition is not detected, continuing execution of said computer program;
   operative if an error condition is detected;
   creating and saving to said first data storage medium a dump file comprising said plurality of RAM save areas and said register values; and
   reproducing the source code execution at the time said error condition was encountered.

2. The method of claim 1, wherein said reproducing step further comprises the steps of:
   locating said error condition in an (i)th save area, wherein (i) is greater than or equal to 1 and less than or equal to (N);
   selecting the (i)th save area, wherein said (i)th save area comprises the (i)th register values;
   matching one or more of the steps of said source code listing with said (i)th register values;
   executing said matched source code step by step to form for each matched step (i)th modified register values;
   creating a log associating each matched source code step with said modified (i)th register values.

3. The method of claim 2, further comprising the steps of:
   electing whether to add one or more prior source code steps to said log;
   operative if electing to add one or more prior source code steps to said log, selecting a (j)th save area, wherein said (j)th save area comprises the (j)th register values, and wherein (j) is greater than or equal to 1 and less than or equal to (N), and wherein (j) is less than (i);
   matching one or more of the steps of said source code listing with said (j)th register values;
   executing said matched source code step by step to form for each matched step (j)th modified register values;
   adding to said log each matched source code step and the associated modified (j)th register values.

4. The method of claim 2, further comprising the steps of:
electing whether to add one or more subsequent source code steps to said log;
operative if electing to add one or more subsequent source code steps to said log, selecting a (k)th save area, wherein said (k)th save area comprises the (k)th register values, and wherein (k) is greater than or equal to 1 and less than or equal to (N), and wherein (k) is greater than (i);
matching one or more of the steps of said source code listing with said (k)th register values;
executing said matched source code step by step to form for each matched step (k)th modified register values;
adding to said log each matched source code step and the associated modified (k)th register values.

5. The method of claim 2, wherein:
said creating and saving step is performed at a first time;
said locating step is performed at a second time, wherein said second time is one or more hours after said first time.

6. The method of claim 5, further comprising the steps of:
providing a second computing device comprising second data storage medium;
saving said dump file to said second data storage medium.

7. An article of manufacture comprising a data storage medium, RAM memory, and a computer usable medium having computer readable program code disposed therein to debug a computer program written to said data storage medium, said computer program comprising source code, the computer readable program code comprising a series of computer readable program steps to effect:
executing said computer program;
loading said computer program into said RAM memory;
generating in said RAM memory a plurality of RAM save areas (N), wherein each RAM save area comprises a plurality of register values, and wherein said RAM save areas are interconnected by blocks of machine language;
determining if an error condition is detected;
operative if an error condition is not detected, continuing execution of said computer program;
operative if an error condition is detected;
creating and saving to said first data storage medium a dump file comprising said plurality of RAM save areas and said register values; and
reproducing the source code execution at the time said error condition was encountered.

8. The article of manufacture of claim 7, said computer readable program code further comprising a series of computer readable program steps to effect:
locating said error condition in an (i)th save area, wherein (i) is greater than or equal to 1 and less than or equal to (N);
selecting the (i)th save area, wherein said (i)th save area comprises the (i)th register values;
matching one or more of the steps of said source code listing with said (i)th register values;
executing said matched source code step by step to form for each matched step (i)th modified register values;
creating a log associating each matched source code step with said modified (i)th register values.

9. The article of manufacture of claim 8, said computer readable program code further comprising a series of computer readable program steps to effect:
selecting a (j)th save area, wherein said (j)th save area comprises the (j)th register values, and wherein (j) is greater than or equal to 1 and less than or equal to (N), and wherein (j) is less than (i);
matching one or more of the steps of said source code listing with said (j)th register values;
executing said matched source code step by step to form for each matched step (j)th modified register values;
adding to said log each matched source code step and the associated modified (j)th register values.

10. The article of manufacture of claim 8, said computer readable program code further comprising a series of computer readable program steps to effect:
selecting a (k)th save area, wherein said (k)th save area comprises the (k)th register values, and wherein (k) is greater than or equal to 1 and less than or equal to (N), and wherein (k) is greater than (i);
matching one or more of the steps of said source code listing with said (k)th register values;
executing said matched source code step by step to form for each matched step (k)th modified register values;
adding to said log each matched source code step and the associated modified (k)th register values.

11. The article of manufacture of claim 8, wherein:
said computer readable program code comprising a series of computer readable program steps to effect said creating and saving said dump file is performed at a first time;
said computer readable program code comprising a series of computer readable program steps to effect locating said error condition in the (i)th save area is performed at a second time, wherein said second time is one or more hours after said first time.

12. The article of manufacture of claim 7, wherein said computer readable program code comprising a series of computer readable program steps to effect encountering an error condition step further comprises computer readable program code comprising a series of computer readable program steps to effect causing said error condition.

13. A computer program product usable with a programmable computer processor having computer readable program code embodied therein to debug a computer comprising source code, comprising:
computer readable program code which causes said programmable computer processor to execute said computer program;
loading said computer program into said RAM memory;
generating in said RAM memory a plurality of RAM save areas (N), wherein each RAM save area comprises a plurality of register values, and wherein said RAM save areas are interconnected by blocks of machine language;
computer readable program code which causes said programmable computer processor to determine if an error condition is detected;
computer readable program code which, if an error condition is not detected, causes said programmable computer processor to continue execution of said computer program;
computer readable program code which, if an error condition is detected, causes said programmable computer processor to create and save to a data storage medium a dump file comprising said plurality of RAM save areas and said register values; and
reproduce the source code execution at the time said error conditions were detected.

14. The computer program product of claim 13, further comprising:
computer readable program code which causes said programmable computer processor to locate said error condition in an (i)th save area, wherein (i) is greater than or equal to 1 and less than or equal to (N);

computer readable program code which causes said programmable computer processor to select the (i)th save area, wherein said (i)th save area comprises the (i)th register values;

computer readable program code which causes said programmable computer processor to match one or more of the steps of said source code listing with said (i)th register values computer readable program code which causes said programmable computer processor to execute said matched source code step by step to form for each matched step (i)th modified register values;

computer readable program code which causes said programmable computer processor to create a log associating each matched source code step with said modified (i)th register values.

15. The computer program product of claim 14, further comprising:

computer readable program code which causes said programmable computer processor to select a (j)th save area, wherein said (j)th save area comprises the (j)th register values, and wherein (j) is greater than or equal to 1 and less than or equal to (N), and wherein (j) is less than (i);

computer readable program code which causes said programmable computer processor to match one or more of the steps of said source code listing with said (j)th register values;

computer readable program code which causes said programmable computer processor to execute said matched source code step by step to form for each matched step (j)th modified register values;

computer readable program code which causes said programmable computer processor to add to said log each matched source code step and the associated modified (j)th register values.

16. The computer program product of claim 14, further comprising:

computer readable program code which causes said programmable computer processor to select a (k)th save area, wherein said (k)th save area comprises the (k)th register values, and wherein (k) is greater than or equal to 1 and less than or equal to (N), and wherein (k) is greater than (i);

computer readable program code which causes said programmable computer processor to match one or more of the steps of said source code listing with said (k)th register values;

computer readable program code which causes said programmable computer processor to execute said matched source code step by step to form for each matched step (k)th modified register values;

computer readable program code which causes said programmable computer processor to add to said log each matched source code step and the associated modified (k)th register values.

17. The computer program product of claim 13, wherein:

said computer readable program code which causes said programmable computer processor to create and save said dump file is executed at a first time;

said computer readable program code which causes said programmable computer processor to locate said error condition in the (i)th save area is performed at a second time, wherein said second time is one or more hours after said first time.

18. The computer program product of claim 13, wherein said computer readable program code comprising a series of computer readable program steps to effect encountering an error condition step further comprises computer readable program code comprising a series of computer readable program steps to effect causing said error condition.

* * * * *